(12) United States Patent
Van Hullebusch

(10) Patent No.: US 9,913,431 B2
(45) Date of Patent: Mar. 13, 2018

(54) AGRICULTURAL HARVESTER CONCAVE CLAMPING SYSTEM

(71) Applicant: CNH Industrial America LLC, New Holland, PA (US)

(72) Inventor: Bart G. L. Van Hullebusch, Knesselare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/167,235

(22) Filed: May 27, 2016

(65) Prior Publication Data

US 2016/0345499 A1    Dec. 1, 2016

(30) Foreign Application Priority Data

May 29, 2015   (BE) .................................. 2015/0155

(51) Int. Cl.
| | |
|---|---|
| *A01F 12/24* | (2006.01) |
| *A01F 12/28* | (2006.01) |
| *A01F 12/18* | (2006.01) |
| *A01F 7/06* | (2006.01) |

(52) U.S. Cl.
CPC ................ *A01F 12/28* (2013.01); *A01F 7/06* (2013.01); *A01F 12/185* (2013.01); *A01F 12/24* (2013.01)

(58) Field of Classification Search
CPC .......... A01F 12/28; A01F 12/26; A01F 12/24; A01F 12/181; A01F 12/185; A01F 12/44; A01F 12/442
USPC ........................................................ 460/108
See application file for complete search history.

(56) References Cited

U.S. PATENT DOCUMENTS

| | | | | |
|---|---|---|---|---|
| 1,099,070 A | * | 6/1914 | McConnell | A01F 12/28 460/109 |
| 2,577,329 A | * | 12/1951 | Irvine | A01F 12/24 241/89 |
| 2,743,728 A | * | 5/1956 | Carlson | A01F 12/185 312/333 |
| 2,794,438 A | * | 6/1957 | Heth | A01F 12/24 241/32 |
| 3,470,881 A | | 10/1969 | Knapp et al. | |
| 3,568,682 A | * | 3/1971 | Knapp | A01F 12/24 460/108 |

(Continued)

FOREIGN PATENT DOCUMENTS

| | | |
|---|---|---|
| EP | 0513574 A1 | 11/1992 |
| JP | 06276839 A * | 10/1994 |

*Primary Examiner* — Arpad Fabian-Kovacs
(74) *Attorney, Agent, or Firm* — Peter K. Zacharias; Patrick M. Sheldrake

(57) ABSTRACT

An agricultural harvester including a chassis and a threshing and separating section for threshing and separating grain from gathered crop material. The threshing and separating section is carried by the chassis. The threshing and separating section includes at least one concave having a hooking feature, at least one sliding support, and a frame assembly for carrying and coupling the at least one concave thereto. The frame assembly includes a support bar allowing the hooking feature of the at least one concave to hook over the support bar to support one side of the at least one concave. Another side of the at least one concave is coupled to the frame assembly. The at least one sliding support supports the at least one concave as the at least one concave is moved toward or away from the support bar.

20 Claims, 6 Drawing Sheets

(56) References Cited

U.S. PATENT DOCUMENTS

| | | | | |
|---|---|---|---|---|
| 3,631,862 A * | 1/1972 | Rowland-Hill | A01F 12/28 | 460/109 |
| 3,734,103 A * | 5/1973 | Mathews | A01F 7/06 | 460/108 |
| 4,711,075 A * | 12/1987 | Strong | A01F 12/24 | 460/110 |
| 4,711,252 A | 12/1987 | Bernhardt et al. | | |
| 5,024,631 A * | 6/1991 | Heidjann | A01F 12/26 | 460/109 |
| 5,919,087 A * | 7/1999 | Strong | A01F 12/24 | 460/109 |
| 6,358,142 B1 * | 3/2002 | Imel | A01F 12/28 | 460/107 |
| 6,398,639 B1 | 6/2002 | Dammann et al. | | |
| 6,485,364 B1 * | 11/2002 | Gryspeerdt | A01D 41/1271 | 460/107 |
| 6,758,745 B2 * | 7/2004 | Van Der Haegen | A01F 12/24 | 460/104 |
| 6,958,012 B2 * | 10/2005 | Duquesne | A01F 12/28 | 460/109 |
| 7,137,882 B2 | 11/2006 | Holtmann et al. | | |
| 7,166,026 B2 * | 1/2007 | Ricketts | A01F 12/26 | 460/108 |
| 7,393,274 B2 * | 7/2008 | Voss | A01F 12/28 | 460/109 |
| 7,473,170 B2 | 1/2009 | McKee et al. | | |
| 8,133,100 B2 * | 3/2012 | Regier | A01F 12/181 | 460/109 |
| 8,133,101 B2 | 3/2012 | Regier et al. | | |
| 8,628,390 B2 | 1/2014 | Baltz et al. | | |
| 9,504,204 B2 * | 11/2016 | Kile | A01F 12/26 | |
| 2011/0151951 A1 * | 6/2011 | Regier | A01F 12/181 | 460/109 |

* cited by examiner

AGRICULTURAL HARVESTER CONCAVE CLAMPING SYSTEM

CROSS REFERENCE TO RELATED APPLICATION

This application claims priority to Belgium Application No. 2015/0155, filed May 29, 2015, the contents of which are incorporated herein by reference.

FIELD OF THE INVENTION

The present invention relates to agricultural harvesters, and, more specifically to the installation of concaves in their associated frames in agricultural harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semitrailer, gravity box, straight truck or the like by an unloading system on the combine that is actuated to transfer grain into the vehicle.

The concaves are coupled to frame members and need to be replaced due to wear or due to changes in the crop being harvested.

In EP 2514300 (U.S. Pat. No. 8,628,390) there is disclosed a support system for separator grates of a harvester. As can be seen in FIGS. 6-11, a grate is moved into an entry location and one side of the grate is hooked onto a supporting bar and then the other side is raised and also hooked onto another supporting bar. As can be seen in FIGS. 9-10 there is room allowed for the installer to reach in and support the grate as it is manipulated into the dual hooked arrangement. The grate is then slid in an axial direction and another grate is inserted at the entry location. The dual hooking arrangement can be seen in FIG. 11, where the hooks have been positioned to diminish the gaps 70 and 82 to preclude the grate from becoming unhooked. A disadvantage with this arrangement is that the grate has to be maneuvered and supported by the installer until it is hooked into position. Another disadvantage is that the grate hooking arrangement has to be manipulated to minimize spacing to keep the grate from becoming unhooked.

What is needed in the art is a cost effective and efficient way of allowing the changing of concaves in the harvester, while minimizing the effort by the installer.

SUMMARY OF THE INVENTION

An exemplary embodiment of the present invention provides for the installation of concaves by one person in a reduced amount of time in the confined space of a threshing section.

In accordance with an aspect of the present invention, there is provided an agricultural harvester includes a chassis, and a threshing and separating section for threshing and separating grain from gathered crop material. The threshing and separating section is carried by the chassis, and includes at least one concave having a hooking feature, at least one sliding support, and a frame assembly for carrying and coupling the concave thereto. The frame assembly has a support bar allowing the hooking feature to hook over the support bar to support one side of the concave. The other side of the concave is also coupled to the frame assembly. The sliding support supports the concave as the concave is moved toward or away from the support bar.

A novel feature that overcomes problems with the prior art includes the supports that allow the concave to be slid over and supported as it is being maneuvered into position. This lets the installer to use the position of the supports to guide the hooking arrangement to the support bar. Another novel feature is the slotted member that allows a fastener to provide sliding support of the concave as it is slid in an axial direction relative to the rotor and then once tightened provides positive attachment of the concave to the frame assembly.

An advantage is that the installation of concaves can be accomplished even though there is a confined space beneath the concaves.

Another advantage is that the concave is supported by two different supports as needed during the installation/removal process, thereby allowing different degrees of movement.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
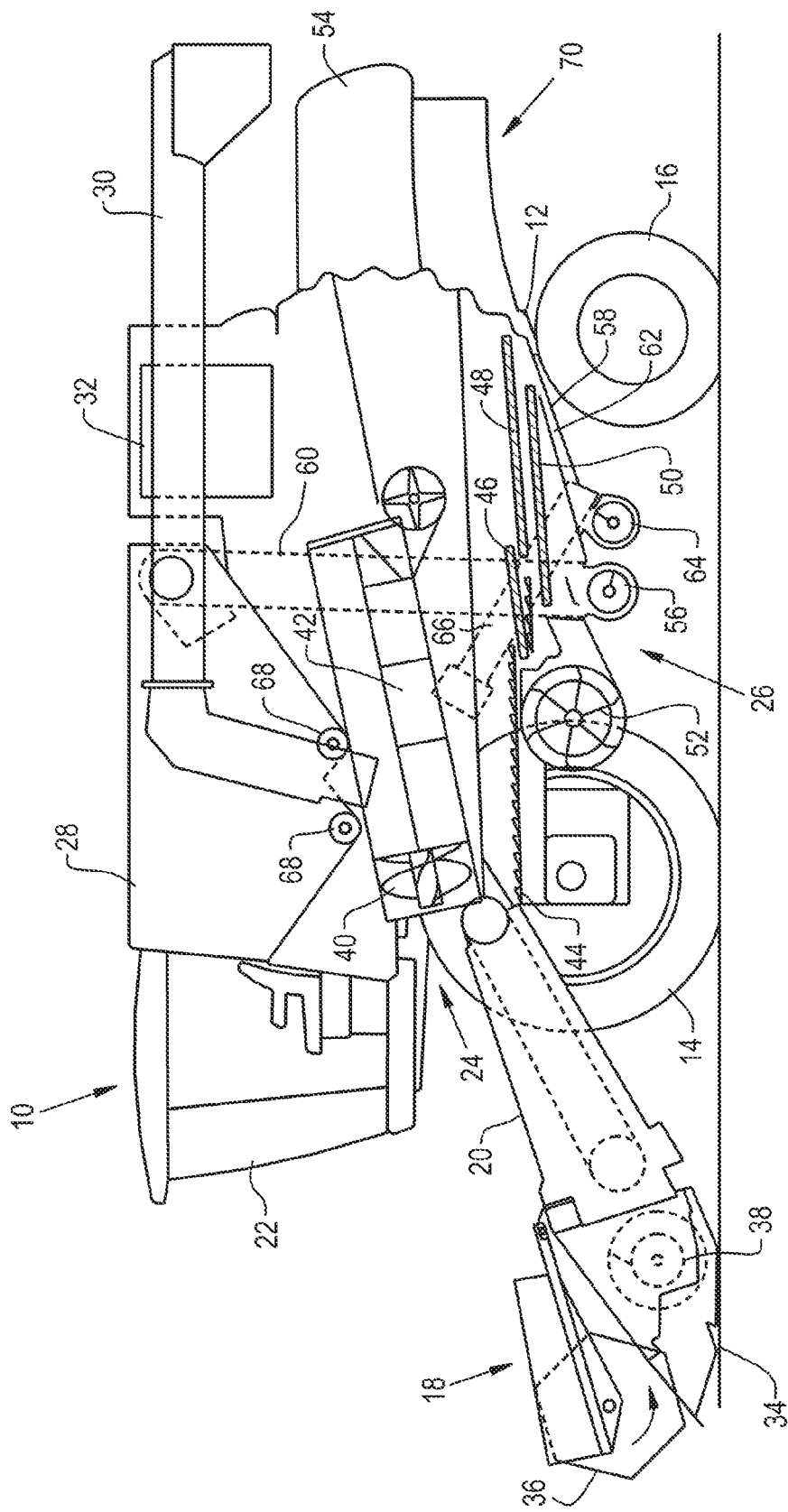
FIG. 1 is a side view of an embodiment of an agricultural harvester in the form of a combine that uses frame assemblies and concaves, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating section or system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain, which has been separated by the threshing and separating system 24, falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
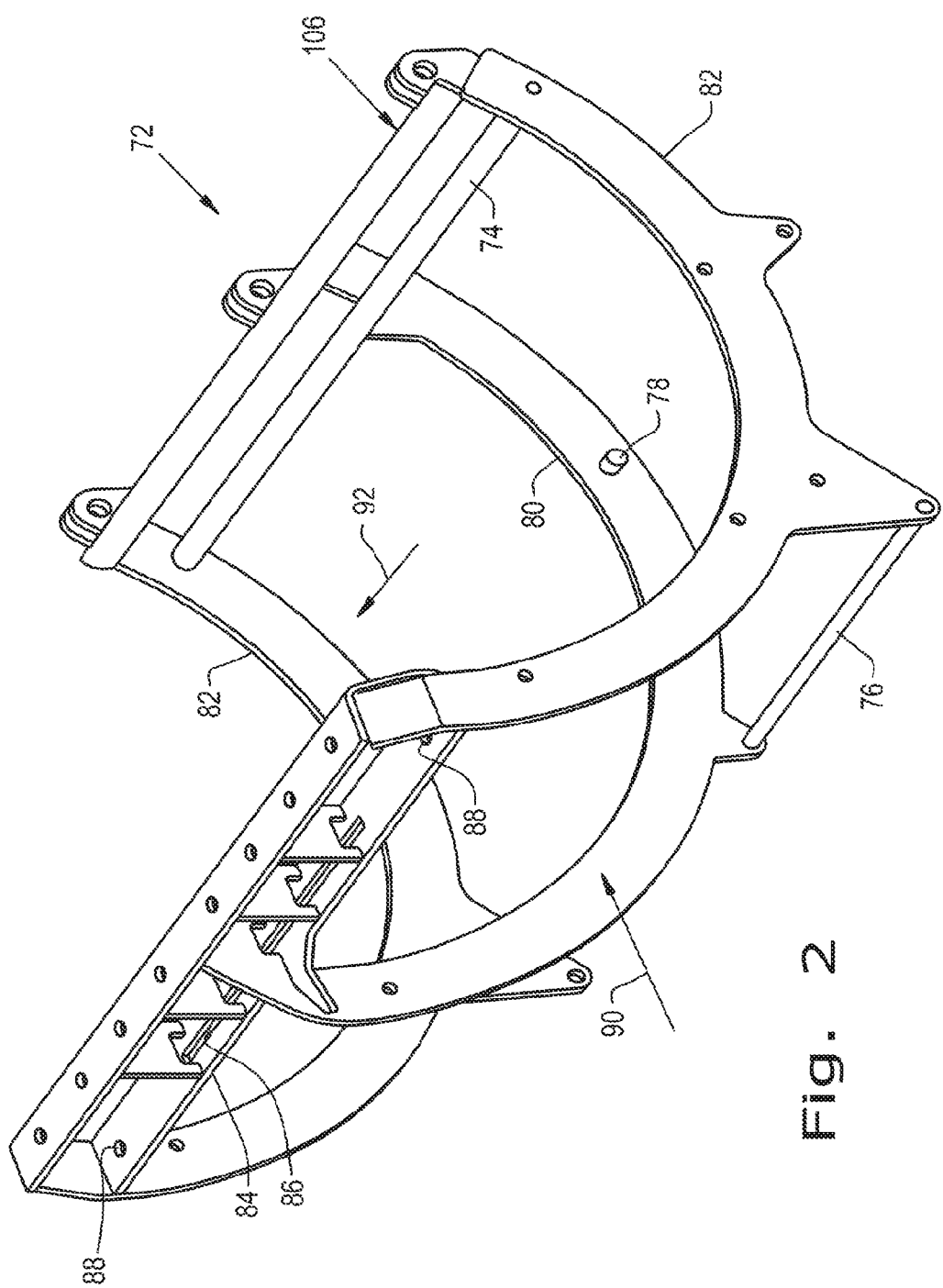
FIG. 2 is a perspective view of an embodiment of a frame assembly for holding concaves in the combine of FIG. 1, in accordance with an exemplary embodiment of the present invention.

Now, additionally referring to FIG. 2 there is shown and illustrated a frame assembly 72, which is part of the threshing and separating system 24. This frame assembly 72 is configured to support two concaves 42, which may be identical or have differing harvesting features. The frame assembly 72 includes a support bar 74, a sliding support 76, sliding supports 78, an inner support 80, two outer supports 82, and a slotted support member 84 having a slot 86 and holes 88. The frame assembly 72 is configured to be adjustably positioned relative to rotor 40 by a control system, not shown for the sake of clarity.

The sliding supports 76 and 78 are shown as a bar and a bushing, either of which can be used for either location, and are located on both inner support 80 and the inside of the one outer support 82. The concave 42 is slid in a direction 90, which is generally normal to an axial direction 92. Slot 86 accommodates a fastener that allows the concave 42 to slide in a direction 92 after being slid into the frame assembly 72 in direction 90.

Figure 3:
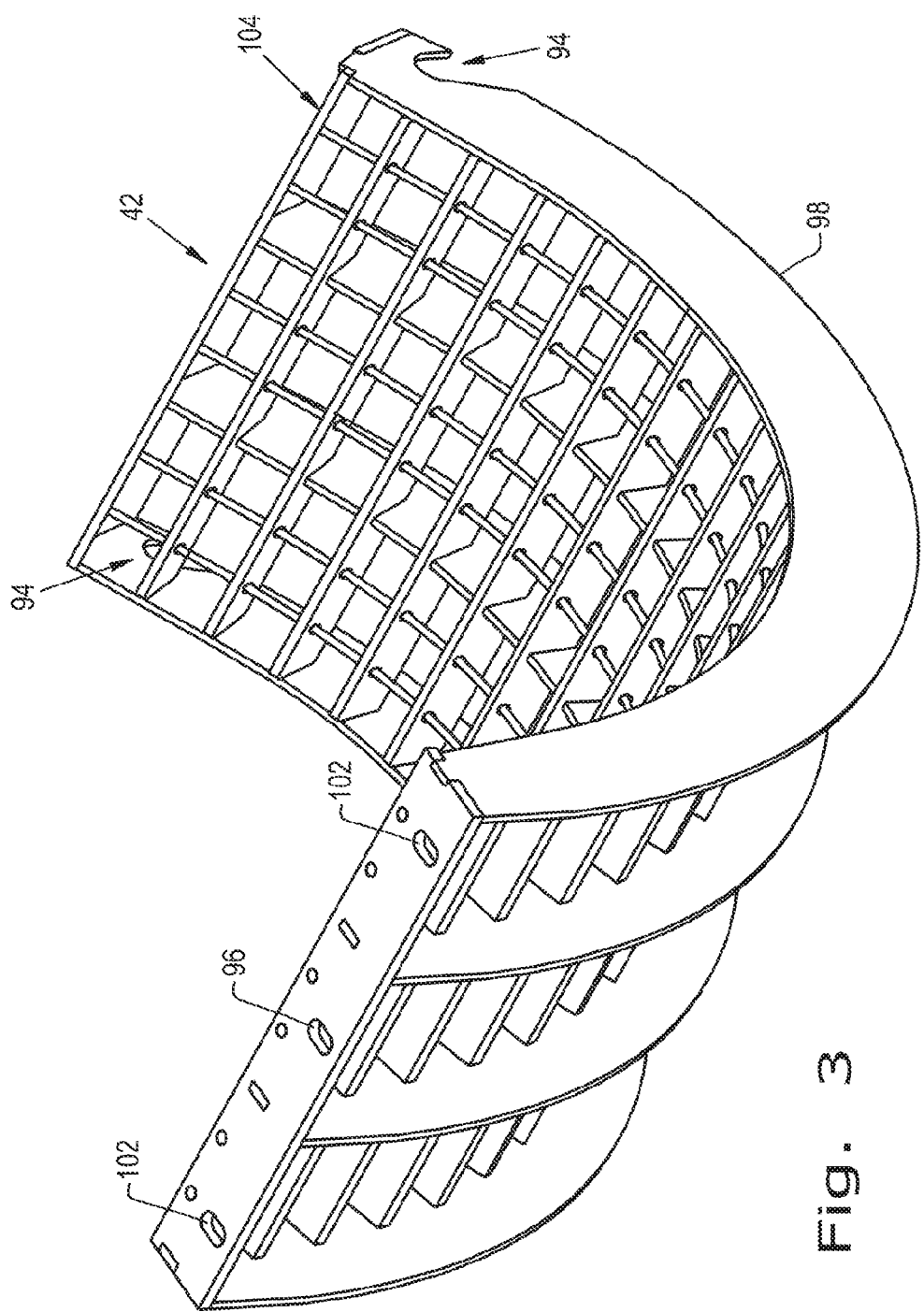
FIG. 3 is a perspective view of an embodiment of a concave to be held by the frame assembly of FIG. 2, in accordance with an exemplary embodiment of the present invention.

Now additionally referring to FIG. 3, there is illustrated a concave 42 having hooking features 94, a hole 96, a bottom 98 and an edge 104. The concave 42 is slid into the frame assembly 72 in direction 90, hooked onto the support bar 74, lifted off of the sliding supports 76 and/or 78, engaged with the slotted support member 84, slid in direction 92 and secured to the frame assembly 72, all of which will be discussed in detail relative to the remaining figures. A second concave 42 is then slid in direction 90 and undergoes the same mounting procedure, but is not slid in direction 92, since that location is occupied by the first concave 42. It is contemplated that the frame assembly 72 may accommodate more than two concaves 42, each being slid to their respective positions after being slid in a non-axial direction into the frame assembly 72.

Now, additionally referring to FIGS. 4-9, there is shown a sequence of positions for the concave 42 as it is positioned in the frame assembly 72. The removal of the concaves 42 follows a basically reversed procedure than that which is discussed for the installation.

Figure 4:
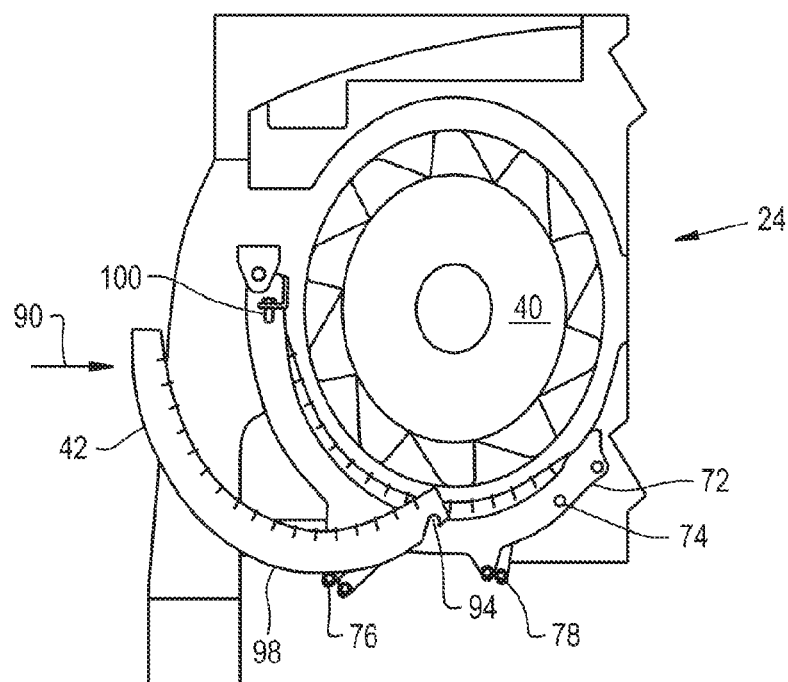
FIG. 4 is a schematical end view of a rotor showing an installation step of the concave of FIG. 3 into a frame assembly of FIG. 2, in accordance with an exemplary embodiment of the present invention.
Figure 5:
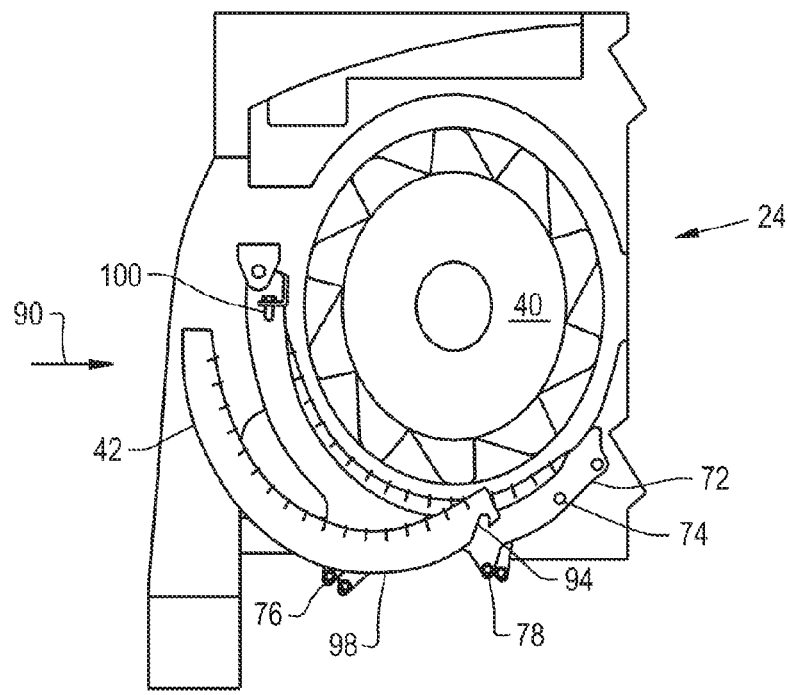
FIG. 5 is a schematical end view of the rotor showing another installation step of the concave of FIG. 3 into a frame assembly of FIG. 2, in accordance with an exemplary embodiment of the present invention.

In FIG. 4, the concave 42 is moved generally in direction 90, with the bottom 98 of the concave 42 contacting the sliding support 76 to thereby support some of the weight of the concave 42. In FIG. 5 the concave is moved further in direction 90 as bottom 98 rolls on or slides over sliding support 76.

Figure 6:
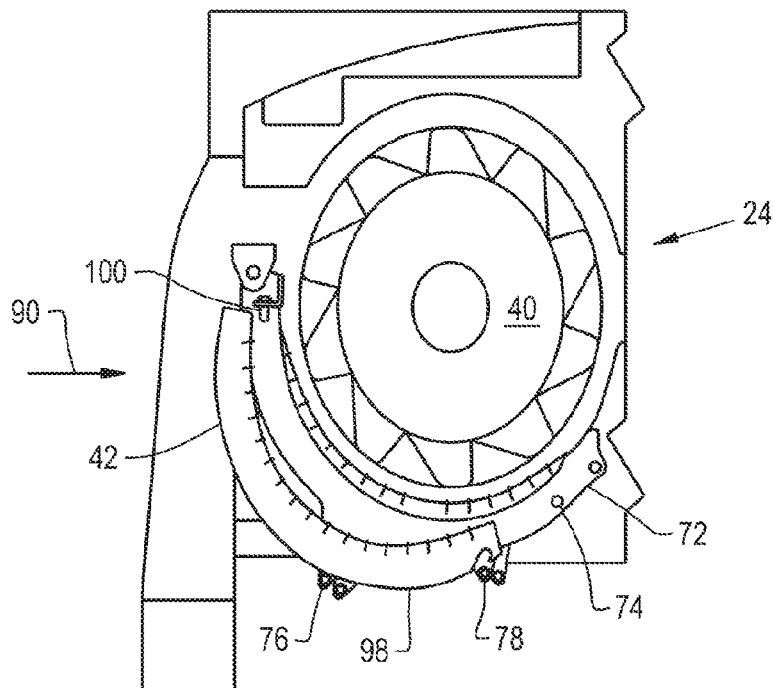
FIG. 6 is a schematical end view of the rotor showing yet another installation step of the concave of FIG. 3 into a frame assembly of FIG. 2, in accordance with an exemplary embodiment of the present invention.
Figure 7:
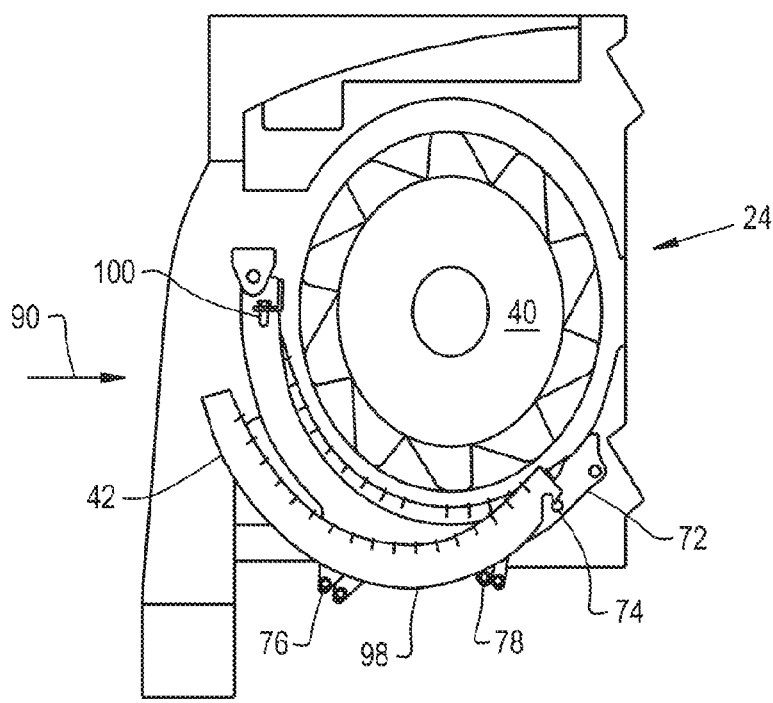
FIG. 7 is a schematical end view of the rotor showing yet another installation step of the concave of FIG. 3 into a frame assembly of FIG. 2, in accordance with an exemplary embodiment of the present invention.

In FIG. 6 the concave 42 is tipped a bit as it continues its motion in direction 90 so as to engage sliding supports 78. Then as shown in FIG. 7 the concave 42 is rolled/slid along supports 76 and 78 so as to approach the support bar 74, in this situation now the supports 76 and 78 carry the whole weight of the concave 42, and allows the operator to do the further installation in an ergonomic manner. Supports 76 and 78 are positioned so that the forward edge of the concave 42 can clear or ramp over support bar 74.

Figure 8:
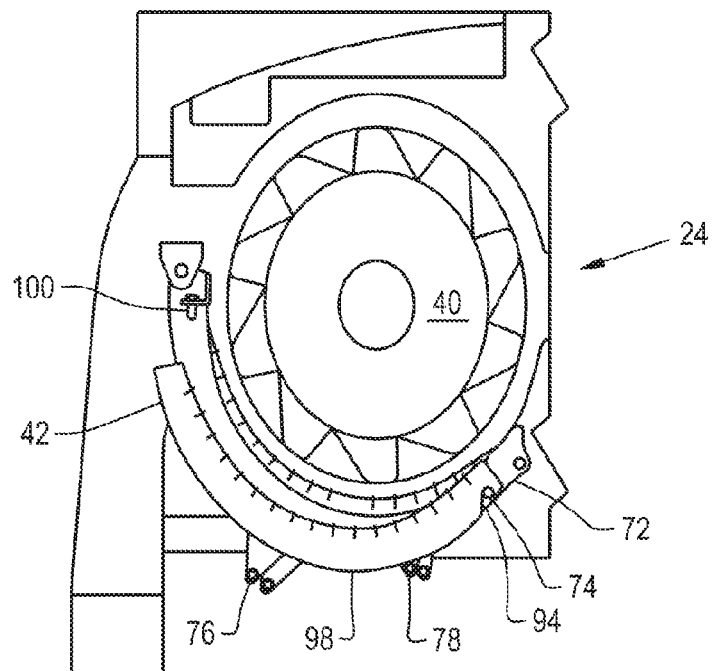
FIG. 8 is a schematical end view of the rotor showing yet another installation step of the concave of FIG. 3 into a frame assembly of FIG. 2, in accordance with an exemplary embodiment of the present invention.
Figure 9:
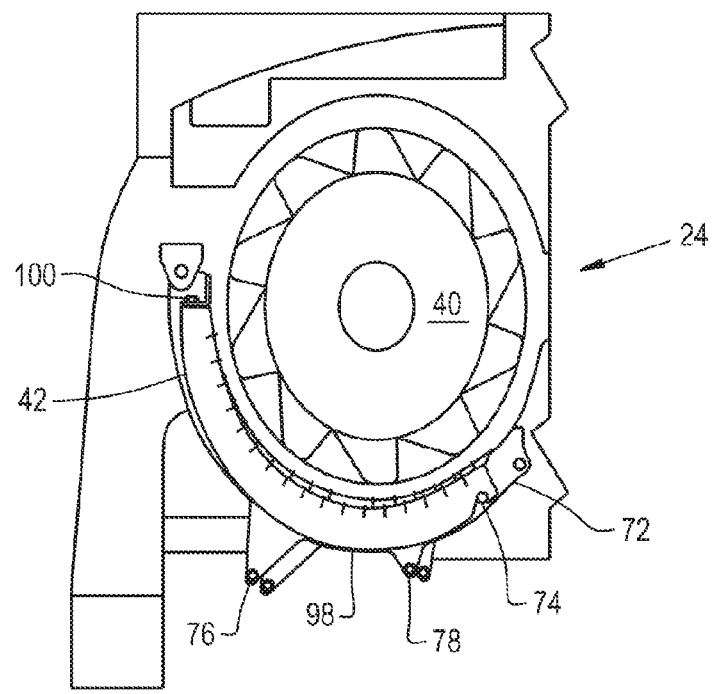
FIG. 9 is a schematical end view of the rotor showing still yet another installation step of the concave of FIG. 3 into a frame assembly of FIG. 2, in accordance with an exemplary embodiment of the present invention.

In FIG. 8, the hooking features 94 of the concave 42 engage the support bar 74 as the concave 42 is lifted on the left side, while still being supported by supports 78. Then, as shown in FIG. 9, the concave 42 is lifted up and engaged with a fastener 100, so that the concave 42 is then held in place by the hooking features 94 and support bar 74 on one side and fasteners 100 on the other side. The configuration of the hooking feature 94, and the edge 104 of the concave 42 and interaction with a beam 106 of the frame assembly, when the concave 42 is installed, is such that the concave 42 is pushed in a downwards direction. In this case forces produced by the harvesting operation will cause the concave 42 to be hooked in a more secure manner to avoid the concave 42 from coming loose.

If the frame assembly 72 holds more than one concave 42, the fastener 100 is inserted through the slot 86 and the hole 96 and is not tightened. The concave 42 is then slid in direction 92 with the concave sliding along the support bar 74 and the loosely engaged fastener 100 supporting the weight of the concave 42. Once the concave 42 is positioned in the desired portion of the frame assembly 72 then the fastener may be tensioned, and other fasteners may be inserted through holes 102 of the concave 42 and the slot 86 and a hole 88 and all the fasteners are tightened to secure the first concave in position. Then a second concave 42 is introduces as discussed regarding FIGS. 4-9, with the second concave 42 being bolted into position without being slid in direction 92, since the frame assembly 72 will have its full complement of concaves 42.

By installing the fasteners 100 the concaves 42 are placed under pretension. The parts are constructed in a way that the resulting forces (the pretension and the forces produced while operating the combine 10) always point in a direction which prevents the concave 42 from coming loose.

The threshing and separating system 24 described herein advantageously eases the task of an installer for the installation and removal of the concaves 42 by providing the bottom supports 76, 78 as the concave 42 is being inserted/retracted. Another advantage is that the frame assembly 72 has a slot 86 for the sliding of a fastener 100 to provide for the support and ease of installation of the concave 42 that is axially displaced in the threshing and separating system 24 from the entry position.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester, comprising:
    a chassis; and
    a threshing and separating section for threshing and separating grain from gathered crop material, the threshing and separating section being carried by the chassis, the threshing and separating section comprising:
    at least one concave comprising a hooking feature;
    at least one sliding support; and
    a frame assembly for carrying and coupling the at least one concave thereto, the frame assembly comprising a support bar allowing the hooking feature of the at least one concave to hook over the support bar to support one side of the at least one concave, another side of the at least one concave being coupled to the frame assembly, the at least one sliding support configured for supporting the at least one concave as the at least one concave is moved toward or away from the support bar in a direction that is generally normal to an axial direction of the threshing and separating section.

2. The agricultural harvester of claim 1, wherein the at least one sliding support is affixed to the frame assembly, the at least one sliding support configured for supporting a bottom of the at least one concave as the at least one concave is inserted into the frame assembly to allow the at least one concave to slide and be pivoted on the at least one sliding support, thereby allowing the hooking feature of the at least one concave to engage the support bar.

3. The agricultural harvester of claim 2, wherein the at least one concave is not in contact with the at least one sliding support once the other side of the at least one concave is coupled to the frame assembly.

4. The agricultural harvester of claim 2, wherein the frame assembly further comprises a slotted support member to which the other side of the at least one concave is configured to be loosely coupled.

5. The agricultural harvester of claim 4, wherein the at least one concave and the frame assembly are configured for the at least one concave to be axially slid along the frame assembly so that the at least one concave moves along the support bar and the slotted support member.

6. The agricultural harvester of claim 5, wherein the at least one concave is a plurality of concaves, wherein another of the plurality of concaves is configured to be inserted into the frame assembly after the concave has been slid axially.

7. The agricultural harvester of claim 4, wherein a fastener is coupled to the concave in the slotted support member so that the fastener may be slid along with the concave.

8. The agricultural harvester of claim 4, wherein the slotted support member comprises a slot that has a length that is approximately one half of an axial length of the frame assembly, the slot configured for accommodating the sliding of a fastener.

9. The agricultural harvester of claim 2, wherein the frame assembly further comprises an inner support that is coupled to the sliding support and the support bar.

10. The agricultural harvester of claim 9, wherein the inner support is spaced downwardly to allow the concave to be slid thereover.

11. A method of loading the at least one concave into the frame assembly of the agricultural harvester of claim 1, the method comprising the steps of:
sliding the at least one concave over the at least one sliding support in a direction generally normal to an axial direction of the threshing and separating section;
hooking the hooking feature of the at least one concave onto the support bar;
lifting the at least one concave off of the at least one sliding support; and
coupling the at least one concave to the frame assembly.

12. The method of claim 11, wherein the frame assembly further comprises a slotted support member, the method further comprising the step of sliding the at least one concave in the axial direction after the coupling step, wherein the step of coupling comprises coupling the at least one concave to the slotted support member.

13. An agricultural harvester, comprising:
a chassis; and
a threshing and separating section for threshing and separating grain from gathered crop material, the threshing and separating section being carried by the chassis, the threshing and separating section comprising:
a concave comprising a hooking feature;
a sliding support; and
a frame assembly for carrying and coupling the concave thereto, the frame assembly comprising a support bar allowing the hooking feature of the concave to hook over the support bar to support one side of the concave, another side of the concave being coupled to the frame assembly, the sliding support configured for supporting the concave as the concave is moved toward or away from the support bar in a direction that is generally normal to an axial direction of the threshing and separating section.

14. The agricultural harvester of claim 13, wherein the sliding support is affixed to the frame assembly, the sliding support configured for supporting a bottom of the concave as the concave is inserted into the frame assembly to allow the concave to slide and be pivoted on the sliding support, thereby allowing the hooking feature of the concave to engage the support bar.

15. The agricultural harvester of claim 14, wherein the frame assembly further comprises a slotted support member to which the other side of the concave is configured to be loosely coupled.

16. The agricultural harvester of claim 15, wherein the concave and the frame assembly are configured for the concave to be axially slid along the frame assembly so that the concave moves along the support bar and the slotted support member.

17. The agricultural harvester of claim 16, further comprising a plurality of concaves, wherein one of the plurality of concaves is configured to be inserted into the frame assembly after the concave has been slid axially.

18. The agricultural harvester of claim 15, wherein the slotted support member comprises a slot that has a length that is approximately one half of an axial length of the frame assembly, the slot configured for accommodating the sliding of a fastener.

19. The agricultural harvester of claim 14, wherein the frame assembly further comprises an inner support that is coupled to the sliding support and the support bar.

20. The agricultural harvester of claim 19, wherein the inner support is spaced downwardly to allow the concave to be slid thereover.

* * * * *